United States Patent [19]

Duncan et al.

[11] Patent Number: 5,028,408

[45] Date of Patent: Jul. 2, 1991

[54] PROCESS FOR THE PRODUCTION OF LITHIUM HYPOCHLORITE

[75] Inventors: Budd L. Duncan, Athens; Larry D. Carpenter, Cleveland; Leslie R. Osborne, Chattanooga, all of Tenn.

[73] Assignee: Olin Corporation, Cheshire, Conn.

[21] Appl. No.: 489,316

[22] Filed: Mar. 2, 1990

[51] Int. Cl.$^5$ .............................................. C01B 11/06
[52] U.S. Cl. .................................................... 423/497
[58] Field of Search .................... 423/473; 252/187.25

[56] References Cited

U.S. PATENT DOCUMENTS

| | | | |
|---|---|---|---|
| 1,481,039 | 1/1924 | Taylor et al. | 423/474 |
| 1,481,040 | 1/1924 | Taylor et al. | 423/474 |
| 3,171,814 | 3/1965 | Orazem et al. | 252/187.25 |
| 3,498,924 | 3/1970 | Walsh et al. | 252/186.25 |
| 4,146,578 | 3/1979 | Brennan et al. | 423/473 |

FOREIGN PATENT DOCUMENTS

| | | | |
|---|---|---|---|
| 628396 | 5/1963 | Belgium | 423/473 |
| 99152 | 1/1984 | European Pat. Off. | 423/473 |
| 349262 | 12/1970 | U.S.S.R. | 423/473 |
| 581944 | 10/1946 | United Kingdom | 423/473 |

*Primary Examiner*—Michael L. Lewis
*Assistant Examiner*—Brian M. Bolam
*Attorney, Agent, or Firm*—James B. Haglind; Paul Weinstein

[57] ABSTRACT

A process for producing lithium hypochlorite comprises admixing an aqueous hypochlorous acid solution having a concentration of 35 percent of greater by weight of HOCl with an aqueous slurry of lithium hydroxide at a temperature in the range of from about 0° to about 20° C. to produce a solution of lithium hypochlorite. The solution is concentrated by evaporation at temperatures in the range of from about 30° to about 60° C. and at subatmospheric pressures to form a paste of lithium hypochlorite. After separating the paste into a cake of lithium hypochlorite and a mother liquor, a potassium compound is admixed with the mother liquor. The process produces a highly pure solid lithium hypochlorite product having a concentration of at least 80 percent available chlorine.

13 Claims, No Drawings

PROCESS FOR THE PRODUCTION OF LITHIUM HYPOCHLORITE

This invention is related to the production of concentrated lithium hypochlorite. More particularly, this invention is related to the production of concentrated lithium hypochlorite from pure concentrated solutions of hypochlorous acid.

Lithium hypochlorite has found application as a swimming pool sanitization agent. Current commercial processes for the manufacture of lithium hypochlorite produce a low assay product of approximately 27% by weight of LiOCl by the chlorination of lithium hydroxide. The impurities in the commercial product include chlorates, carbonates, sulfates, and chlorides of potassium, sodium, or lithium. The process is in addition complex and costly.

Various other processes for the manufacture of LiOCl of a higher degree of purity have been described. U.S. Pat. Nos. 1,481,039 and 1,481,040 teach a method for the production of LiOCl with a low level of impurities by chlorination of LiOH. The conformed LiOCl is removed by alcohol extraction to form an alkyl hypochlorite, which is then treated with excess LiOH to recover the LiOCl.

U.S. Pat. No. 3,498,924, issued Mar. 3, 1970 to Walsh et al. describes the reaction of dilute hypochlorous acid solutions with sodium hydroxide. According to the patent, anhydrous sodium hypochlorite, sodium hypochlorite hydrate, and basic sodium hypochlorites can be produced. The authors contemplate the formation of solid produts of potassium hypochlorite, lithium hypochlorite, and alkaline earth metal hypochlorites by this reaction.

Surprisingly, now it has been discovered that solid lithium hypochlorite can be produced directly and with ease for use in sanitizing and bleaching applications.

It is an object of the present invention to provide a process for producing lithium hypochlorite which substantially reduces the presence of impurities such as chlorates, carbonates, sulfates, and chlorides.

Another object of the present invention is to provide a process for producing lithium hypochlorite which eliminates the need for extraction with an organic solvent.

An additional object of the present invention is to provide a process for producing lithium hypochlorite which reduces the amount of expensive lithium hydroxide required.

A further object of the present invention is to provide a process for producing lithium hypochlorite which readily dries the lithium hypochlorite product to desired moisture contents with a minimum of product loss.

A still further object of the present invention is to provide a process for producing lithium hypochlorite which reduces the number of processing steps required.

The novel process for producing lithium hypochlorite comprises admixing a hypochlorous acid solution having a concentration of 35 percent or greater by weight of HOCl with an aqueous slurry of lithium hydroxide at a temperature in the range of from about 0° to about 20°.

The novel process of the present invention employs as the starting material a concentrated solution of hypochlorous acid, HOCl. A process for producing the concentrated solution of hypochlorous acid is carried out in a suitable reactor such as one provided with means for spraying discrete droplets of an aqueous solution of an alkali metal hydroxide into the reactor; means for feeding gaseous chlorine into the reactor; means for withdrawing solid alkali metal chloride product from the reactor; and means for withdrawing a gaseous mixture comprised of hypochlorous acid, chlorine monoxide, unreacted chlorine and water vapor from the reactor. The reactor, reactant feed lines, or both are provided with suitable heating means for maintaining the reaction at a temperature sufficiently high to vaporize the hypochlorous acid product and water and to dry the alkali metal chloride particles.

Any alkali metal hydroxide capable of reacting with gaseous chlorine to form hypochlorous acid may be employed as a reactant in the process of this invention. Typical examples of suitable alkali metal hydroxides include sodium hydroxide, potassium hydroxide, lithium hydroxide and mixtures thereof. Sodium hydroxide is the preferred reactant since the resulting sodium chloride by-product is more easily disposed of than the other alkali metal chlorides. As gaseous mixtures having high concentrations of hypochlorous acid and chlorine monoxide are desired, highly concentrated aqueous solutions of the alkali metal hydroxide are used. Suitable concentrations include those in the range of from about 40 to about 80, and preferably from about 45 to about 60 percent by weight of alkali metal hydroxide.

The alkali metal hydroxide solution is sprayed from at least one atomizer preferably positioned at or near the top of the reactor. The atomizer is preferably positioned along the central axis of a cylindrical reactor, to provide minimum contact between the atomized droplets and the walls. The atomizer may be directed up, down, sideways or any other orientation that meets the above conditions. Droplet sizes are selected which permit a substantially complete reaction of the droplets of alkali metal hydroxide with chlorine, the vaporization of hypochlorous acid and water produced and the production of substantially dry alkali metal chloride particles having low concentrations of chlorate.

The dry alkali metal chloride particles produced, while smaller than the original droplets, are preferably sufficiently large enough to prevent a significant portion of the particles from being entrained in the gaseous mixture of hypochlorous acid produced.

Typical atomizing techniques of the pneumatic, hydraulic, and spinning disc type, among others, which are suitable for use in the process of this invention, are described in the monograph entitled "Atomization and Spray Graining" by W. R. Marshall, Jr., Chemical Engineering Progress Monograph Series, No. 2, volume 50, 1954. A gas, such as chlorine gas, under pressure may be used to atomize droplets of aqueous alkali metal hydroxide by premixing before discharge from the nozzle, or the liquid droplets and chlcrine gas are mixed after discharge from their respective nozzles. The chlorine gas which reacts with the alkali metal hydroxide is fed directly to the reactor.

The process of for producing concentrated hypochlorous acid employs a large excess of chlorine gas above the stoichiometric amount of alkali metal hydroxide as illustrated by the following equation:

$$Cl_2 + NaOH \rightarrow HOCl + NaCl \qquad (1).$$

Suitable excess amounts of chlorine gas include those in which the molar ratio of chlorine to alkali metal hydroxide is equal or greater than about 20:1. For example, excess amounts of chlorine may include molar ratios from 20:1 to about 200:1, preferably from about 25:1 to about 100:1, and more preferably from about 30:1 to about 50:1.

These large excesses of chlorine gas result in increased yields of hypochlorous acid as the formation of chlorate is minimized and its concentration in the alkali metal chloride particles is less than about 10 percent by weight, and preferably less than about 6 percent by weight. In addition, the use of large excesses of chlorine gas provide an improved method of maintaining the reaction temperature. In a continuous process, the gaseous mixture of hypochlorous acid vapor, water vapor, chlorine gas, and chlorine monoxide gas produced in the reactor is removed from the reactor and passed through a solids separator to remove any fine particles of alkali metal chloride which may be resent. The solids-free gaseous mixture is then liquified to produce an aqueous solution of hypochlorous acid having, for example, from about 40 to about 60, and preferably from about 45 to about 50 percent by weight of HOCl. The liquefaction may be carried out, for example, by condensing the gaseous mixture at temperatures in the range of from about $-5°$ to about $+10°$ C.

The concentrated hypochlorous acid solution is free of ionic impurities such as alkali metal, chloride, and chlorate ions. For example, concentrations of the chloride ion are less than about 50 parts per million; the alkali metal ion concentration is less than about 50 parts per million; and the chlorate ion concentration is no higher than about 100 parts per million.

The second reactant in the novel process of the present invention is lithium hydroxide in the anhydrous or monohydrated form. The lithium hydroxide employed is, for example, a commercially available industrial grade, preferably having low concentrations of impurities such as lithium chloride. In the process, lithium hydroxide is employed as an aqueous slurry containing from about 10 to about 40, preferably from about 15 to about 35, and more preferably from about 25 to about 35 percent by weight of LiOH. While lower concentrations of LiOH may be used, their use results in excessive amounts of filtrate for recycle or disposal.

In the novel process of the present invention, the hypochlorous acid solution is admixed with the lithium hydroxide to form a reaction mixture which is stirred or agitated to provide a homogeneous reaction mixture. During the process, the temperature of the reaction mixture is maintained for example, in the range of from about $0°$ C. to about $20°$ C., and preferably from about $5°$ C. to about $10°$ C. The reaction mixture is monitored for excess alkalinity and when this decreases to about 1 percent, the product solution is removed.

The process of the invention is represented by the following equation:

$$\text{LiOH} + \text{HOCl} \rightarrow \text{LiOCl} + \text{H}_2\text{O} \qquad (2)$$

As shown in the above equation, only one mole of lithium hydroxide is required per mole of lithium hypochlorite. The lithium hypochlorite solution produced has a concentration of from about 15 to about 39, and preferably from about 25 to about 35 percent by weight of LiOCl. The product solutions contain small amounts of impurities such as lithium chlorate and lithium chloride which are formed during the reaction.

The lithium hypochlorite solutions produced are highly pure and could be used directly in the sanitizing of water. However it is preferred to use solid forms of lithium hypochlorite and the solutions of lithium hypochlorite are concentrated, for example, by evaporation at subatmospheric pressures at temperatures in the range of from about $30°$ to about $60°$, and preferably from about $40°$ to about $50°$ C.

Suitable pressures are those which are about 10% or less of the vapor pressure of the solution at the concentration temperature. The concentration process is continued until a slurry of lithium hypochlorite containing at least 40 percent by weight, for example, from about 42 to about 50 percent by weight of LiOCl. Excess solution is removed by any suitable solid-liquid separation method such as filtration.

The addition of a potassium compound, such as solid KOH or a solution of KOCl to the filtrate recovered results in the precipitation of solid $KClO_3$ which is readily removed from the solution. The remaining filtrate may be utilized to suspend lithium hydroxide for further hypochlorination. Small amounts of this filtrate may be discarded depending upon the level of the chloride impurities present. It is envisioned that this same technique would be useful in the removal of deleterious $Ca(ClO_3)_2$ from solutions generated in the manufacture of calcium hypochlorite.

The concentrated slurry is dried using any suitable gentle drying method to produce solid lithium hypochlorite having the desired moisture content. For example, the concentrated slurry may be dried in a fluidized bed dryer, a spray dryer, a vacuum pan dryer, etc. where the drying temperature is in the range of from about $50°$ C. to about $200°$ C.

The solid lithium hypochlorite product is a highly pure source of available chlorine having a concentration of at least 80 percent available chlorine, and preferably, in the range of from about 80 to about 120 percent. As the process of the invention does not employ extraction with an organic solvent, the product is free of organic impurities. Further, the process employs a molar ratio of the costly lithium hydroxide to hypochlorous acid of about 1:1 in comparison to the processes commercially employed up to the present which require a molar ratio of at least 2:1.

A solid with a lower LiOCl content may be advantageously produced by direct drying of the solution obtained from the hypochlorinator. This two-step process will produce a solid product containing 60–75% by weight of lithium hypochlorite and will eliminate the evaporation and solids separation steps associated with the production of the 80 to 90% by weight lithium hypochlorite.

To further illustrate the invention the following examples are provided without any intention of being limited thereby. All parts and percentages are by weight unless otherwise specified.

EXAMPLE I

A slurry of 15% LiOH (221 g.) was prepared by suspending 79 g of solid $LiOH \cdot H_2O$ in water. To this slurry, an aqueous hypochlorous acid solution containing 38 percent by weight HOCl was added until all of the lithium hydroxide had been converted to a solution of lithium hypochlorite. To this solution an additional 79 g of $LiOH \cdot H_2O$ was then added and the addition of the aqueous solution of HOCl was continued until the lithium hydroxide was completely converted to a solution of LiOCl. The solution of LiOCl was then subjected to vacuum evaporation at temperatures increasing from 35° C. to 50° C. Components and their concentrations are given in Table 1 below:

TABLE I

| Component | HOCl* | LiOH* | Slurry* | Paste* |
|---|---|---|---|---|
| HOCl | 38 | | | |
| LiOH | | 57 | 0.8 | 1.7 |
| LiOCl | | | 25.0 | 48.1 |
| LiClO₃ | | | 1.6 | 2.7 |
| LiCl | | | 0.8 | 1.2 |
| H₂O | 62 | 43 | 71.8 | 46.3 |

*Wt. %

EXAMPLE 2

The process of Example 1 was repeated to produce a paste of lithium hypochlorite containing 40.6 percent by weight of LiOCl. The paste was filtered on a coarse fritted Buchner funnel to produce a filter cake containing 56.2 percent by weight of lithium hypochlorite. This filter cake was then dried in a fluid bed dryer at air temperatures ranging 50° C. to 60° C. The product contained 24.8 percent by weight of moisture. There was little or no decomposition during the drying stage. The components and their concentrations are given in Table 2 below.

TABLE II

| Component | HOCl* | LiOH* | Slurry* | Paste* | Felt* | Cake* | Dried* (50° C.) | Dried* (60° C.) |
|---|---|---|---|---|---|---|---|---|
| LiOH | 44.4 | 57 | 0.7 | 1.2 | 1.5 | 0.6 | 1.5 | 0.6 |
| LiOCl | | | 25.4 | 40.6 | 34.7 | 56.2 | 66.6 | 68.4 |
| LiClO₃ | | | 1.9 | 3.8 | 4.8 | 2.7 | 3.1 | 4.1 |
| LiCl | | | 1.6 | 2.9 | 3.9 | 2.3 | 3.0 | 2.1 |
| H₂O | 55.6 | 43 | 70.4 | 51.5 | 55.1 | 38.2 | 25.8 | 24.8 |

*Wt. %

EXAMPLE 3

The process of Example 2 was repeated to produce a cake containing 59.45% by weight of LiOCl. This cake was dried at a temperature of 83° C. for 60 minutes to produce a product containing 75.0% LiOCl with a moisture content of 12.2% water. The lithium hypochlorite product produced corresponded to a mixture of LiOCl.H₂O and anhydrous LiOCl. The dry basis LiOCl was reduced from 88.5% to 85.4%, indicating very slight degradation of the product while drying.

EXAMPLE 4

The process of Example 2 was repeated and a portion of the product placed in constant temperature storage oven at 45° C. and allowed to stand for 30 days at this temperature. The initial product analyzed 75.7% LiOCl by weight. The moisture content was 11%. At the end of thirty days, the product analyzed 73.7% LiOCl by weight. This corresponds to relative loss of sanitizing power of 2.7% over 30 days. This illustrates the surprisingly high stability of the lithium hypochlorite solid produced by this process.

EXAMPLE 5

A slurry of 20% lithium hydroxide (737 g) was prepared by suspending 263 g of solid LiOH.H₂O in water. This slurry was then cooled to 0° C. An aqueous hypochlorous acid solution containing 43.7% by weight HOCl was added to the LiOH slurry while maintaining a temperature below 20° C. until the excess alkalinity of the lithium hypochlorite solution reached one percent. An additional 263 g of LiOH.H₂O was introduced to the LiOCl solution. The HOCl addition continued at a temperature below 20° C. until the LiOH was completely converted to LiOCl. The LiOCl solution was then vacuum evaporated at temperatures ranging from 45° C. to 50° C. to produce a slurry containing 41.6% by weight of LiOCl. The slurry was vacuum filtered to produce a cake with a LiOCl concentration of 56.4% by weight. The filter cake was then dried in a fluid bed dryer for 20 to 25 minutes at an air temperature of 90° C.

TABLE III

| Component | HOCl* | LiOH* | Solution* | Slurry* | Cake* | Product* |
|---|---|---|---|---|---|---|
| HOCl | 46.0 | | | | | |
| LiOCl | | | 27.8 | 41.6 | 56.4 | 70.1 |
| LiClO₃ | | | 1.1 | 2.1 | 3.4 | 5.2 |
| LiCl | | | 1.2 | 2.2 | 3.1 | 8.2 |
| LiOH | | 57.0 | 1.0 | 1.5 | 1.8 | 3.2 |
| H₂O | 54.0 | 53.0 | 68.9 | 52.6 | 53.3 | 13.3 |

*Wt. %

EXAMPLE 6

A slurry of 20% lithium hydroxide (13,274 g) was prepared by suspending 4737 g of LiOH.H₂O in water. The slurry was then cooled to 0.° C. While maintaining a temperature below 10° C., an aqueous hypochlorous acid solution containing 47% by weight HOCl was added to the LiOH slurry until the excess alkalinity approached one percent. An additional 4737 g of LiOH.H₂O was introduced to the LiOH solution. The HOCl addition continued at a temperature below 20° C. until the LiOH was completely converted to LiOCl. The LiOCl solution was then spray dried at an inlet temperature ranging from 210° C. to 260° C. and an atomizer air pressure of 20 to 25 lbs. The exit temperature of the dryer system ranged from 100° C. to 130° C. The dried solid LiOCl had the consistency of powder with an 18.7% water content.

TABLE IV

| Component | HOCl* | LiOH* | Solution* | Product* |
|---|---|---|---|---|
| HOCl | 47.0 | | | |
| LiOCl | | | 29.1 | 57.2 |
| LiClO₃ | | | 0.5 | 5.7 |
| LiCl | | | 2.0 | 13.1 |
| LiOH | | 57.0 | 0.7 | 5.3 |
| H₂O | 53.0 | 43.0 | 67.7 | 18.7 |

*Wt. %

What is claimed is:

1. A process for producing lithium hypochlorite which comprises admixing an aqueous hypochlorous acid solution having a concentration of 35 percent or greater by weight of HOCl with an aqueous slurry of lithium hydroxide at a temperature in the range of from about 0° to about 20° C. to produce a solution of lithium hypochlorite; concentrating the solution of lithium hypochlorite by evaporation at temperatures in the range of from about 30° to about 60° C. and at sub-atmospheric pressures to form a lithium hypochlorite; separating the paste into a cake of lithium hypochlorite and a mother liquor; and admixing a potassium hydroxide or potassium hypochlorite with the mother liquor.

2. The process of claim 1 in which the molar ratio of lithium hydroxide to hypochlorous acid is about 1:1.

3. The process of claim 1 in which the solution of lithium hypochlorite contains from about 15 to about 40 percent by weight of LiOCl.

4. The process of claim 1 in which the cake of lithium hypochlorite is dried at a temperature of from about 50° to about 200° C. to produce a solid lithium hypochlorite having an available chlorine concentration of from about 80 to about 120 percent.

5. The process of claim 3 in which the solution of lithium hypochlorite contains from about 25 to about 35 percent by weight of LiOCl.

6. The process of claim 5 in which the solution of lithium hypochlorite is dried at a temperature of from about 50° to about 200° C. to produce a solid lithium hypochlorite containing from about 60 to about 75 percent by weight of LiOCl.

7. A process for producing lithium hypochlorite which comprises:
   a) reacting droplets of an aqueous solution of an alkali metal hydroxide with gaseous chlorine in a reaction mixture in which the molar ratio of chlorine to the alkali metal hydroxide is at least about 20:1 to produce hypochlorous acid and solution alkali metal chloride particles,
   b) vaporizing the hypochlorous acid to separate a gaseous mixture comprised of hypochlorous acid vapor, chlorine monoxide gas, chlorine gas and water vapor from the solid alkali metal chlorine particles,
   c) condensing the gaseous mixture at a temperature in the range of from about −5° to about +10° C. to produce a solution of hypochlorous acid having a concentration of at least 35% by weight of HOCl,
   d) admixing the concentrated hypochlorous acid solution with an aqueous slurry of lithium hydroxide at a temperature in the range of from about 0° to about 20° C. to produce an aqueous solution of lithium hypochlorite;
   e) concentrating the solution of lithium hypochlorite by evaporation at temperatures in the range of from about 30° to about 60° C. and at sub-atmospheric pressures to form a paste of lithium hypochlorite;
   f) separating the paste into a cake of lithium hypochlorite and a mother liquor; and,
   g) admixing a potassium hydroxide or potassium hypochlorite with the mother liquor.

8. The process of claim 7 in which the molar ratio of lithium hydroxide to hypochlorous acid is about 1:1.

9. The process of claim 7 in which the solution of lithium hypochlorite contains from about 15 to about 40 percent by weight of LiOCl.

10. The process of claim 7 in which the solution of hypochlorous acid has a concentration of from about 40 to about 60 percent by weight of HOCl.

11. The process of claim 7 in which the cake of lithium hypochlorite is dried at a temperature of from about 50° to about 200° C. to produce a solid lithium hypochlorite having an available chlorine concentration of from about 80 to about 120 percent.

12. The process of claim 9 in which the solution of lithium hypochlorite contains from about 25 to about 35 percent by weight of LiOCl.

13. The process of claim 12 in which the solution of lithium hydrochlorite is dried at a temperature of from about 50° to about 200° C. to produce a solid lithium hydrochlorite containing from about 60 to about 75 percent by weight of LiOCl.

* * * * *

UNITED STATES PATENT AND TRADEMARK OFFICE
CERTIFICATE OF CORRECTION

PATENT NO. : 5,028,408
DATED : July 2, 1991
INVENTOR(S) : Budd L. Duncan et al

It is certified that error appears in the above—identified patent and that said Letters Patent is hereby corrected as shown below:

Column 1, line 23, please delete "conformed" and insert ---coformed--- in its place.

Column 1, line 33, please delete "produts" and insert ---products--- in its place.

At column 3, line 17, please delete "resent" and insert ---present--- in its place.

At column 7, line 2, between "to form a" and "lithium" please add ---paste of---.

At column 8, line 34, please delete "hydrochlorite" and insert ---hypochlorite--- in its place.

At column 8, line 36, please delete "hydrochlorite" and insert ---hypochlorite--- in its place.

Signed and Sealed this

Sixteenth Day of February, 1993

Attest:

STEPHEN G. KUNIN

Attesting Officer     Acting Commissioner of Patents and Trademarks